US008918233B2

(12) United States Patent
Yadav et al.

(10) Patent No.: US 8,918,233 B2
(45) Date of Patent: Dec. 23, 2014

(54) TECHNIQUE FOR PROVIDING MULTIPLE UNDO AND REDO OPERATIONS FOR FLIGHT MANAGEMENT SYSTEMS

(75) Inventors: Harishankar Singh Yadav, Bangalore (IN); Praveen Kumar Bhavarlal, Bangalore (IN); Begum Raziya, Bangalore (IN); Subramanya Rattihalli Lakshmana Setty, Bangalore (IN); Pankaj Venkatrao Kulkarni, Bangalore (IN)

(73) Assignee: Airbus Engineering Centre India, Bangalore (IN)

( * ) Notice: Subject to any disclaimer, the term of this patent is extended or adjusted under 35 U.S.C. 154(b) by 314 days.

(21) Appl. No.: 13/402,900

(22) Filed: Feb. 23, 2012

(65) Prior Publication Data

US 2012/0215387 A1 Aug. 23, 2012

(30) Foreign Application Priority Data

Feb. 23, 2011 (IN) ............................. 542/CHE/2011

(51) Int. Cl.
*G05D 1/00* (2006.01)
*G08G 5/00* (2006.01)

(52) U.S. Cl.
CPC ............ *G08G 5/0021* (2013.01); *G08G 5/0039* (2013.01)
USPC ............................................................. 701/3

(58) Field of Classification Search
USPC ............... 701/3, 4, 5, 6, 7, 8, 9, 18; 244/75.1, 244/175, 183, 186
See application file for complete search history.

(56) References Cited

U.S. PATENT DOCUMENTS

2008/0059058 A1* 3/2008 Caillaud et al. ............... 701/206
2008/0163093 A1 7/2008 Lorido
2009/0319100 A1* 12/2009 Kale et al. ......................... 701/4

FOREIGN PATENT DOCUMENTS

EP 2136276 A2 12/2009

* cited by examiner

*Primary Examiner* — Khoi Tran
*Assistant Examiner* — Adam Mott
(74) *Attorney, Agent, or Firm* — Prakash Nama; Global IP Services, PLLC

(57) ABSTRACT

A technique for providing multiple undo and redo operations for flight management systems is disclosed. In one embodiment, in a method of providing multiple undo and redo operations for a flight plan in a flight management system, a temporary flight plan and a reference flight plan are created upon initiating a first revision on a created or default active flight plan. The temporary flight plan includes a copy of the active flight plan and the initiated first revision. The reference flight plan is a copy of the active flight plan. Further, multiple undo and redo functions are enabled upon initiating multiple revisions on the temporary flight plan for performing multiple undo and redo operations on the temporary flight plan.

15 Claims, 14 Drawing Sheets

204 206 208

202 210

| ORIGINAL STATE OF THE FLIGHT PLAN | WITH COMPANY ROUTE "RED" | | | |
|---|---|---|---|---|
| | | | | |
| ACTIVE FLIGHT PLAN | COPY OF ACTIVE FLIGHT PLAN | TMPY FLIGHT PLAN | LIST OF PILOT ACTIONS | ACTION POINTER |
| LFBO | EMPTY | EMPTY | EMPTY | NULL |
| ET | | | | |
| RED | | | | |
| TOE | | | | |
| TBN79 | | | | |
| TBN40 | | | | |
| LFBO32L | | | | |

FIG. 2

200

| | | | | |
|---|---|---|---|---|
| PILOT ACTION #2 | DELETE TBN79 | | | |
| | | | | |
| ACTIVE FLIGHT PLAN | COPY OF ACTIVE FLIGHT PLAN | TMPY FLIGHT PLAN | LIST OF PILOT ACTIONS | ACTION POINTER |
| LFBO | LFBO | LFBO | INSERT WOLF AFTER TOE | |
| ET | ET | ET | DELETE TBN79 | << |
| RED | RED | RED | | |
| TOE | TOE | TOE | | |
| TBN79 | TBN79 | WOLF | | |
| TBN40 | TBN40 | -- DISCON -- | | |
| LFBO32L | LFBO32L | TBN40 | | |
| | | LFBO32L | | |
| | | | | |
| PILOT OPTIONS | INSERT TMPY | ERASE TMPY | UNDO | |

202 204 206 208 210 302 304 402 400

FIG. 4

204 206 208

202 210

| | | | | |
|---|---|---|---|---|
| PILOT ACTION #3 | INSERT ORGAN AFTER ET | | | |
| | | | | |
| ACTIVE FLIGHT PLAN | COPY OF ACTIVE FLIGHT PLAN | TMPY FLIGHT PLAN | LIST OF PILOT ACTIONS | ACTION POINTER |
| LFBO | LFBO | LFBO | INSERT WOLF AFTER TOE | |
| ET | ET | ET | DELETE TBN79 | |
| RED | RED | ORGAN | INSERT ORGAN AFTER ET | << |
| TOE | TOE | -- DISCON -- | | |
| TBN79 | TBN79 | RED | | |
| TBN40 | TBN40 | TOE | | |
| LFBO32L | LFBO32L | WOLF | | |
| | | -- DISCON -- | | |
| | | TBN40 | | |
| | | LFBO32L | | |
| PILOT OPTIONS | INSERT TMPY | ERASE TMPY | UNDO | |

302 304 402

FIG. 5

500

204 206 208

202 210

| | | | | |
|---|---|---|---|---|
| PILOT ACTION #4 | DELETE DISCON AFTER WOLF | | | |
| | | | | |
| ACTIVE FLIGHT PLAN | COPY OF ACTIVE FLIGHT PLAN | TMPY FLIGHT PLAN | LIST OF PILOT ACTIONS | ACTION POINTER |
| LFBO | LFBO | LFBO | INSERT WOLF AFTER TOE | |
| ET | ET | ET | DELETE TBN79 | |
| RED | RED | ORGAN | INSERT ORGAN AFTER ET | |
| TOE | TOE | -- DISCON -- | DELETE DISCON AFTER WOLF | << |
| TBN79 | TBN79 | RED | | |
| TBN40 | TBN40 | TOE | | |
| LFBO32L | LFBO32L | WOLF | | |
| | | TBN40 | | |
| | | LFBO32L | | |
| | | | | |
| PILOT OPTIONS | INSERT TMPY | ERASE TMPY | UNDO | |

302 304 402

FIG. 6 600

204 206 208

202 210

| | | | | |
|---|---|---|---|---|
| PILOT ACTION #5 | PILOT PERFOMED UNDO | | | |
| | | | | |
| ACTIVE FLIGHT PLAN | COPY OF ACTIVE FLIGHT PLAN | TMPY FLIGHT PLAN | LIST OF PILOT ACTIONS | ACTION POINTER |
| LFBO | LFBO | LFBO | INSERT WOLF AFTER TOE | |
| ET | ET | ET | DELETE TBN79 | |
| RED | RED | ORGAN | INSERT ORGAN AFTER ET | << |
| TOE | TOE | -- DISCON -- | DELETE DISCON AFTER WOLF | |
| TBN79 | TBN79 | RED | | |
| TBN40 | TBN40 | TOE | | |
| LFBO32L | LFBO32L | WOLF | | |
| | | -- DISCON -- | | |
| | | TBN40 | | |
| | | LFBO32L | | |
| PILOT OPTIONS | INSERT TMPY | ERASE TMPY | UNDO | REDO |

302 304 402 702

FIG. 7

700

204 206 208

| PILOT ACTION #6 | SEQUENCE ET | | | |
|---|---|---|---|---|
| | | | | |
| ACTIVE FLIGHT PLAN | COPY OF ACTIVE FLIGHT PLAN | TMPY FLIGHT PLAN | LIST OF PILOT ACTIONS | ACTION POINTER |
| ET | LFBO | ET | INSERT WOLF AFTER TOE | |
| RED | ET | ORGAN | DELETE TBN79 | |
| TOE | RED | -- DISCON -- | INSERT ORGAN AFTER ET | << |
| TBN79 | TOE | RED | DELETE DISCON AFTER WOLF | |
| TBN40 | TBN79 | TOE | SEQUENCE ET | |
| LFBO32L | TBN40 | WOLF | | |
| | LFBO32L | -- DISCON -- | | |
| | | TBN40 | | |
| | | LFBO32L | | |
| | | | | |
| PILOT OPTIONS | INSERT TMPY | ERASE TMPY | UNDO | REDO |

202 210

302 304 402 702

FIG. 8

800

| | | | | |
|---|---|---|---|---|
| PILOT ACTION #8 | SEQUENCE RED | | | |
| | | | | |
| ACTIVE FLIGHT PLAN | COPY OF ACTIVE FLIGHT PLAN | TMPY FLIGHT PLAN | LIST OF PILOT ACTIONS | ACTION POINTER |
| RED | LFBO | ET | INSERT WOLF AFTER TOE | |
| TOE | ET | ORGAN | DELETE TBN79 | |
| TBN79 | RED | -- DISCON -- | INSERT ORGAN AFTER ET | |
| TBN40 | TOE | RED | SEQUENCE ET | |
| LFBO32L | TBN79 | TOE | DELETE TBN40 | |
| | TBN40 | WOLF | | << |
| | LFBO32L | -- DISCON -- | | |
| | | LFBO32L | | |
| | | | | |
| | | | | |
| PILOT OPTIONS | INSERT TMPY | ERASE TMPY | UNDO | REDO |

202 204 206 208 210 302 304 402 702

FIG. 10

1000

| | | | | |
|---|---|---|---|---|
| PILOT ACTION #9 | PILOT PERFORMED UNDO | | | |
| | | | | |
| ACTIVE FLIGHT PLAN | COPY OF ACTIVE FLIGHT PLAN | TMPY FLIGHT PLAN | LIST OF PILOT ACTIONS | ACTION POINTER |
| RED | LFBO | ET | INSERT WOLF AFTER TOE | |
| TOE | ET | ORGAN | DELETE TBN79 | |
| TBN79 | RED | -- DISCON -- | INSERT ORGAN AFTER ET | << |
| TBN40 | TOE | RED | SEQUENCE ET | |
| LFBO32L | TBN79 | TOE | DELETE TBN40 | |
| | TBN40 | WOLF | | |
| | LFBO32L | -- DISCON -- | | |
| | | TBN40 | | |
| | | LFBO32L | | |
| | | | | |
| PILOT OPTIONS | INSERT TMPY | ERASE TMPY | UNDO | REDO |

202 204 206 208 210 302 304 402 702

FIG. 11

1100

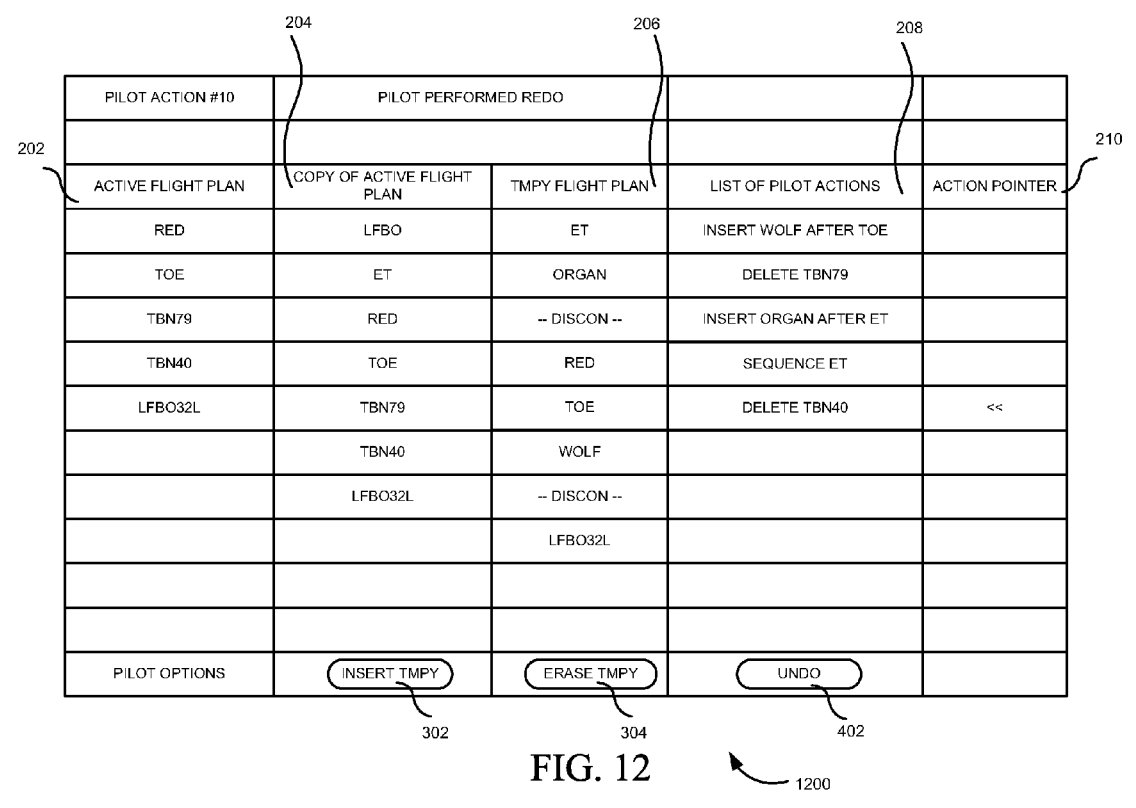

| | | | | |
|---|---|---|---|---|
| PILOT ACTION #10 | PILOT PERFORMED REDO | | | |
| | | | | |
| ACTIVE FLIGHT PLAN | COPY OF ACTIVE FLIGHT PLAN | TMPY FLIGHT PLAN | LIST OF PILOT ACTIONS | ACTION POINTER |
| RED | LFBO | ET | INSERT WOLF AFTER TOE | |
| TOE | ET | ORGAN | DELETE TBN79 | |
| TBN79 | RED | -- DISCON -- | INSERT ORGAN AFTER ET | |
| TBN40 | TOE | RED | SEQUENCE ET | |
| LFBO32L | TBN79 | TOE | DELETE TBN40 | << |
| | TBN40 | WOLF | | |
| | LFBO32L | -- DISCON -- | | |
| | | LFBO32L | | |
| | | | | |
| | | | | |
| PILOT OPTIONS | INSERT TMPY | ERASE TMPY | UNDO | |

FIG. 12

204 206 208

202 210

| | | | | |
|---|---|---|---|---|
| PILOT ACTION #11 | OVERFLY AT TOE | | | |
| | | | | |
| ACTIVE FLIGHT PLAN | COPY OF ACTIVE FLIGHT PLAN | TMPY FLIGHT PLAN | LIST OF PILOT ACTIONS | ACTION POINTER |
| RED | LFBO | ET | INSERT WOLF AFTER TOE | |
| TOE | -- DISCON -- | ORGAN | DELETE TBN79 | |
| TBN79 | ET | -- DISCON -- | SEQUENCE ET | |
| TBN40 | RED | RED | SEQUENCE ET | |
| LFBO32L | TOE | TOE^ | DELETE TBN40 | |
| | TBN79 | WOLF | OVERFLY AT TOE | << |
| | TBN40 | -- DISCON -- | | |
| | LFBO32L | LFBO32L | | |
| | | | | |
| | | | | |
| PILOT OPTIONS | INSERT TMPY | ERASE TMPY | UNDO | |

302 304 402

FIG. 13

1300

TECHNIQUE FOR PROVIDING MULTIPLE UNDO AND REDO OPERATIONS FOR FLIGHT MANAGEMENT SYSTEMS

RELATED APPLICATIONS

Benefit is claimed under 35 U.S.C. 119(a)-(d) to Foreign application Serial No. 542/CHE/2011 filed in INDIA entitled "TECHNIQUE FOR PROVIDING MULTIPLE UNDO AND REDO OPERATIONS FOR FLIGHT MANAGEMENT SYSTEMS" by AIRBUS ENGINEERING CENTRE INDIA, filed on Feb. 23, 2011, which is herein incorporated in its entirety by reference for all purposes.

FIELD OF TECHNOLOGY

Embodiments of the present subject matter relate to flight management systems. More particularly, embodiments of the present subject matter relate to modification of an active flight plan.

BACKGROUND

Flight plans are documents filed by pilots or a flight dispatcher with a local civil aviation authority prior to departure. The flight plans include basic information such as departure and arrival points, estimated time en route, alternate airports in case of bad weather, type of flight (whether instrument flight rules or visual flight rules), pilot's name, number of people on board, and the like. In a flight management system, during a flight planning, the pilot can create and modify existing route by performing lateral or vertical revisions such as delete waypoint, insert next waypoint, constraints, over fly, new destination, arrival, departure, and so on. In existing flight management systems, even though the pilot performs multiple revisions on the flight plan, the pilot can only revert back route modifications made using lateral or vertical revisions once.

SUMMARY

A technique for providing multiple undo and redo operations for flight management systems is disclosed. According to one aspect of the present subject matter, in a method of providing multiple undo and redo operations for a flight plan in a flight management system, an active flight plan is either created by a pilot or uses a default active flight plan. A temporary flight plan and a reference flight plan are also created upon initiating a first revision on the active flight plan. The temporary flight plan includes a copy of the active flight plan and the initiated first revision, and the reference flight plan is a copy of the active flight plan. Further, multiple undo and redo functions are enabled upon initiating multiple revisions on the temporary flight plan for performing multiple undo and redo operations on the temporary flight plan.

According to another aspect of the present subject matter, a flight management system includes a processor, and memory coupled to the processor. The memory includes a flight plan module where the flight plan module includes a multiple undo and redo module. The flight management system also includes a display unit. The display unit includes one or more action buttons for performing multiple undo and redo operations, where the multiple undo and redo module has instructions capable of enabling multiple undo and redo functions upon initiating multiple revisions on a temporary flight plan for performing the multiple undo and redo operations on the temporary flight plan.

According to yet another aspect of the present subject matter, a non-transitory computer-readable storage medium for providing multiple undo and redo operations for a flight plan in a flight management system having instructions that, when executed by a computing device, cause the computing device to perform a method as described above.

The methods, apparatuses, and systems disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein:

FIG. 2 illustrates a display unit displaying the flight plan, according to one embodiment;

FIG. 4 illustrates a display unit displaying a pilot action on the temporary flight plan, according to one embodiment;

FIG. 5 illustrates a display unit displaying another pilot action on the temporary flight plan, according to one embodiment;

FIG. 6 illustrates a display unit displaying yet another pilot action on the temporary flight plan, according to one embodiment;

FIG. 7 illustrates a display unit displaying a redo action button, according to one embodiment;

FIG. 8 illustrates a display unit, according to one embodiment;

FIG. 10 illustrates a display unit, according to another embodiment;

FIG. 11 illustrates a display unit displaying an undo operation by the pilot, according to one embodiment;

FIG. 12 illustrates a display unit displaying a redo operation by the pilot, according to one embodiment;

FIG. 13 illustrates a display unit displaying another pilot action, according to one embodiment.

The drawings described herein are for illustration purposes only and are not intended to limit the scope of the present disclosure in any way.

DETAILED DESCRIPTION

A technique for providing multiple undo and redo operations for flight management systems is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
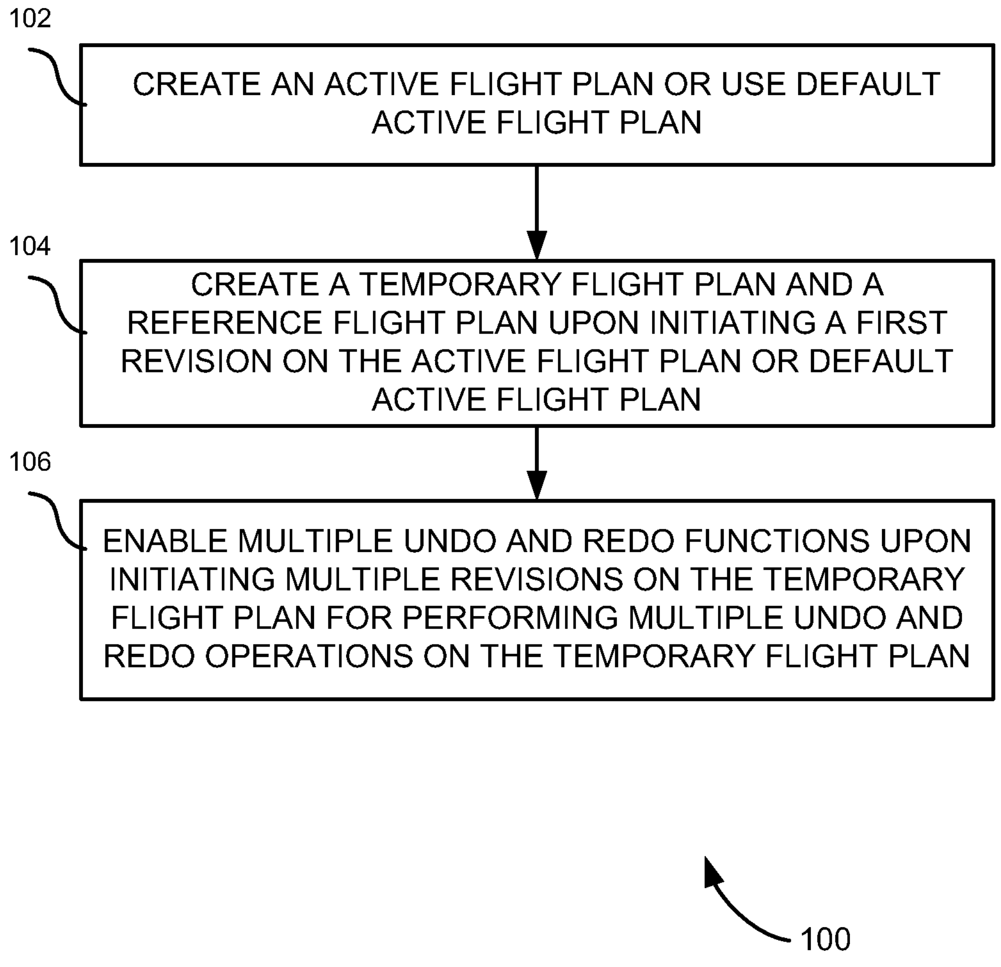
FIG. 1 illustrates a flow diagram of an exemplary method of providing multiple undo and redo operations for a flight plan in a flight management system, according to one embodiment.

FIG. 1 illustrates a flow diagram 100 of an exemplary method of providing multiple undo and redo operations for a flight plan in a flight management system, according to one embodiment. At step 102, an active flight plan (e.g., the active flight plan 202 of FIGS. 2 through 13) is either created by a pilot or uses a default active flight plan. At step 104, a temporary flight plan (e.g., the temporary flight plan 206 of FIGS. 2 through 13) and a reference flight plan are created upon initiating a first revision on the active flight plan. The temporary flight plan includes a copy of the active flight plan and the initiated first revision. Further, the reference flight plan is a copy of the active flight plan (e.g., the copy of active flight plan 204 of FIGS. 2 through 13).

At step 106, multiple undo and redo functions are enabled upon initiating multiple revisions on the temporary flight plan for performing multiple undo and redo operations on the temporary flight plan. In one example, a first undo function is enabled upon initiating a second revision on the temporary flight plan. Then, a first undo operation is performed to update the temporary flight plan and to enable a first redo function. A first redo operation is performed to enable the first undo function. Further, a second undo function is enabled upon initiating a third revision on the updated temporary flight plan.

Further, a second undo operation is performed to further update the updated temporary flight plan and to enable a second redo function. Upon performing a second redo operation, the second redo function is disabled. In one example, an insert operation may be performed to overwrite the active flight plan with the updated temporary flight plan. In another example, an erase operation may be performed to delete the updated temporary flight plan and the reference flight plan and to disable the insert, erase, undo, and redo functions. Furthermore, the first revision, the second revision, and the third revision are stored in a list of action plans or list of pilot actions.

FIG. 2 illustrates a display unit 200 displaying a flight plan, according to one embodiment. As shown, the display unit 200 displays an active flight plan 202, a copy of the active flight plan 204, a temporary flight plan 206, a list of pilot actions or a list of action plans 208 and an action pointer 210. The active flight plan 202 includes waypoints LFBO, ET, RED, TOE, TBN79, TBN40, and LFBO32L. The copy of the active flight plan 204 and temporary flight plan 206 are empty. Also, as shown in FIG. 2, the list of action plans 208 is empty and the action pointer 210 is null. In one example, when the pilot modifies the active flight plan 202 by performing a lateral revision "insert WOLF after TOE", the copy of the active flight plan 204 and the temporary flight plan 206 are created.

Figure 3:
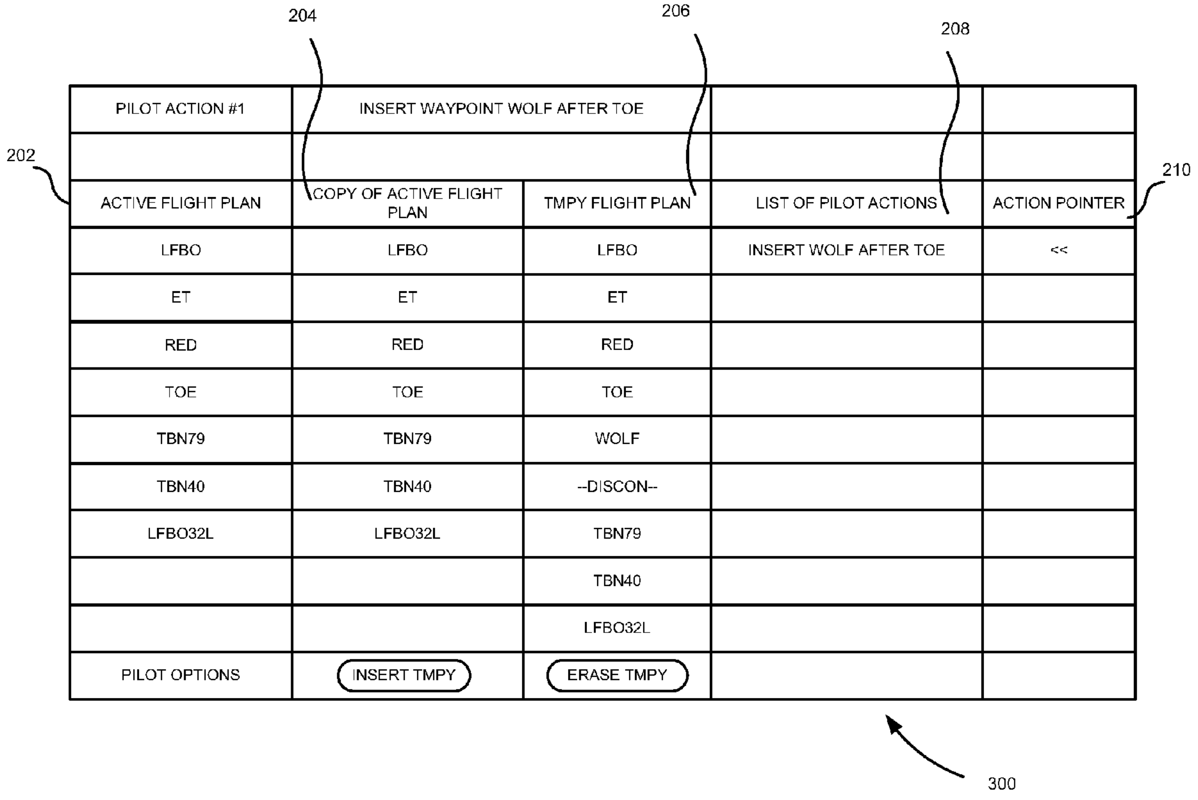
FIG. 3 illustrates a display unit displaying a copy of an active flight plan and a temporary flight plan.

FIG. 3 illustrates a display unit 300 displaying the copy of the active flight plan 204 and the temporary flight plan 206. As shown, the temporary flight plan 206 includes the waypoint WOLF after TOE. When the temporary flight plan 206 is not empty, action buttons are functional to perform multiple undo and redo operations on the temporary flight plan 206. The action buttons include insert TMPY 302 and erase TMPY 304 as shown in the display unit 300. The action button insert TMPY 302 enables the pilot to accept the revised flight plan by replacing the temporary flight plan 206 with the active flight plan 202. The action button erase TMPY 304 enables the pilot to erase the temporary flight plan 206 if the pilot does not want any revisions on the active flight plan 202. Further, the pilot action "insert waypoint WOLF after TOE" is stored in the list of action plans 208 and the action pointer 210 points to the stored pilot action.

FIG. 4 illustrates a display unit 400 displaying a pilot action on the temporary flight plan 206, according to one embodiment. For example, the pilot performs "delete TBN79" lateral revision on the temporary flight plan 206. This pilot action is stored in the list of pilot actions 208. Further, the action pointer 210 points to the newly stored pilot action and an undo action button 402 is enabled.

FIG. 5 illustrates a display unit 500 displaying another pilot action on the temporary flight plan 206, according to one embodiment. For example, the pilot performs a lateral revision "insert ORGAN after ET" on the temporary flight plan 206. The lateral revision "insert ORGAN after ET" is stored in the list of action plans 208 and the action pointer 210 is pointing to the current revision by the pilot.

FIG. 6 illustrates a display unit 600 displaying yet another pilot action on the temporary flight plan 206, according to one embodiment. The pilot performs a lateral revision "delete DISCON after WOLF" on the temporary flight plan 206. The lateral revision "delete DISCON after WOLF" is stored in the list of action plans 208 and the action pointer 210 is pointing to the current revision. When the pilot performs an undo operation, the action pointer 210 points to a previous element in the list of action plans 208. Then, the temporary flight plan 206 is overwritten by the copy of active flight plan 204 and all the operations on the temporary flight plan 206 till the action pointer 210 may be executed.

FIG. 7 illustrates a display unit 700 displaying a redo action button 702, according to one embodiment. In one embodiment, the redo action button 702 may be enabled when the action pointer 210 is not pointing to the last action by the pilot. The redo action button 702 enables the pilot to redo the undone action on the temporary flight plan 206.

FIG. 8 illustrates a display unit 800, according to one embodiment. As shown, active leg of the active flight plan 202 matches with active leg of the temporary flight plan 206. Hence, the temporary flight plan 206 gets sequenced. The sequence ET action may be stored in the list of action plans 208. Further, the redo action button 702 may be enabled if the action pointer 210 is not pointing at the last action.

Figure 9:
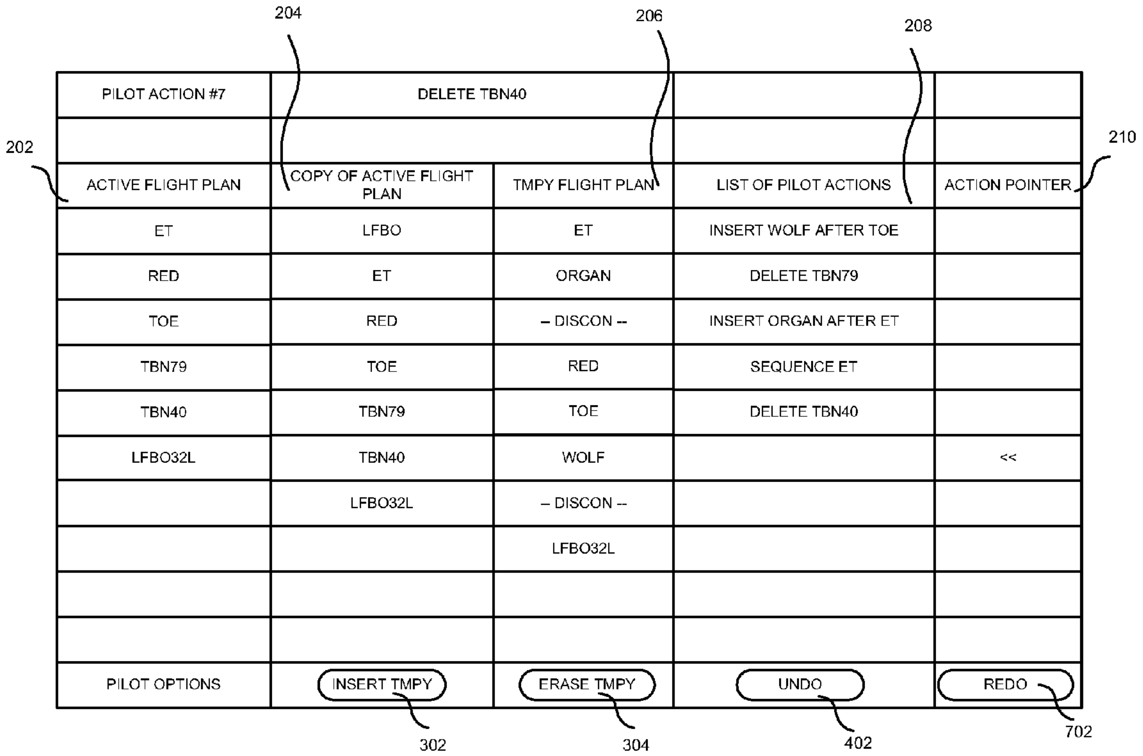
FIG. 9 illustrates a display unit displaying a further another pilot action, according to one embodiment.

FIG. 9 illustrates a display unit 900 displaying a further another pilot action, according to one embodiment. For example, the pilot performs a lateral revision "delete TBN40" on the temporary flight plan 206. The lateral revision "delete TBN40" is stored in the list of action plans 208 and the action pointer 210 is pointing to the current revision. The "sequence ET" action is system generated and is not removed from the list of action plans 208. The pilot action "delete DISCON after WOLF" is removed from the list of action plans 208 to get desired effect.

FIG. 10 illustrates a display unit 1000, according to another embodiment. As shown, the active leg of the active flight plan 202 does not match with the temporary flight plan 206. Hence, the temporary flight plan 206 is not sequenced. The action which results in changes in both the flight plans (i.e., the active flight plan 202 and the temporary flight plan 206) may only be stored.

FIG. 11 illustrates a display unit 1100 displaying an undo operation by the pilot, according to one embodiment. For example, the action pointer 210 points to a previous element in the list of action plans 208. The temporary flight plan 206 is overwritten by the copy of active flight plan 204. Then, on the temporary flight plan 206, all operations till the action pointer 210 are executed. The sequence ET is a system generated action and hence not undone.

FIG. 12 illustrates a display unit 1200 displaying a redo operation by the pilot, according to one embodiment. The action pointer 210 points to a next element in the list of action plans 208. The temporary flight plan 206 is overwritten by the copy of active flight plan 204. Then, on the temporary flight plan, all the operations till the action pointer 210 are executed.

FIG. 13 illustrates a display unit 1300 displaying another pilot action, according to one embodiment. For example, the pilot performed an action "overfly at TOE". In one example, all revisions stored in the list of action plans 208 from current location of the action pointer 210 to the last revision may be removed. The last revision is stored as the "overfly at TOE" and the action pointer 210 points to the last revision. Further, the redo action button is disabled as the action pointer 210 is pointing to the last revision in the list of action plans 208.

Figure 14:
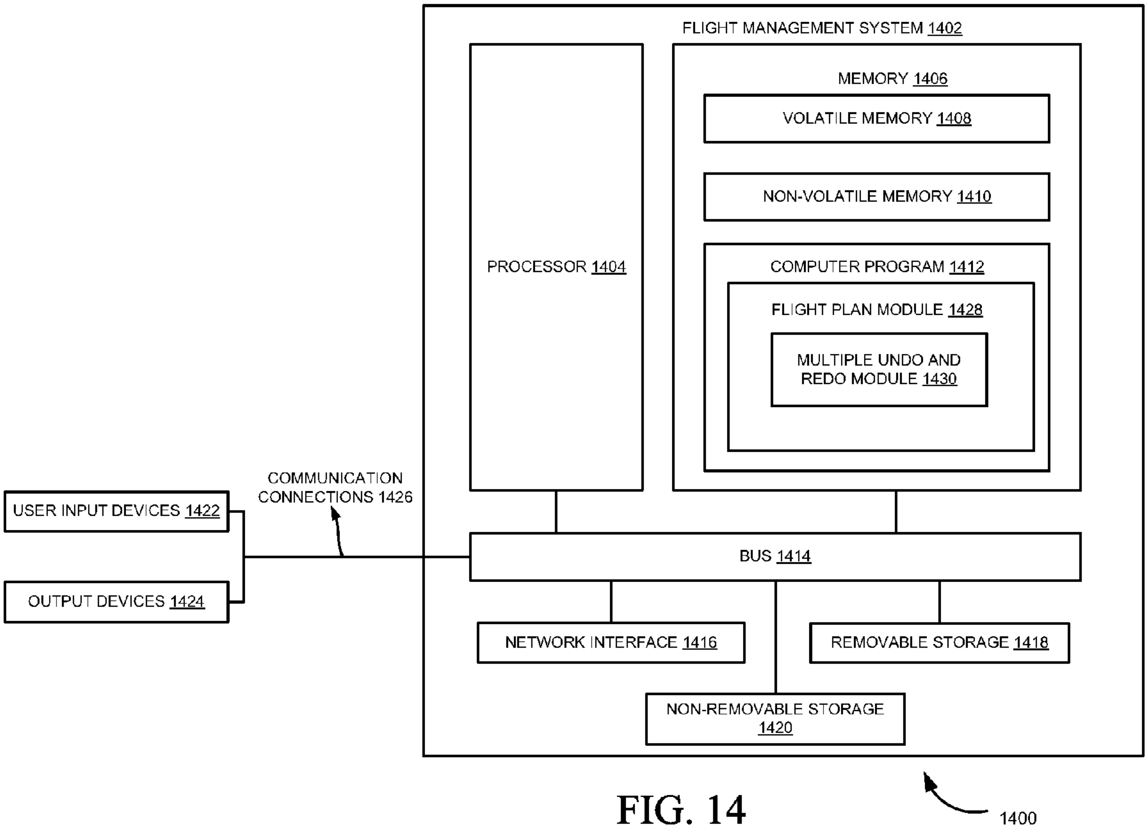
FIG. 14 shows an example of a suitable computing system environment for implementing embodiments of the present subject matter.

FIG. 14 shows an example of a suitable computing system environment 1400 for implementing embodiments of the present subject matter. FIG. 14 and the following discussion are intended to provide a brief, general description of a suitable computing environment in which certain embodiments of the inventive concepts contained herein may be implemented.

A flight management system 1402 may include a processor 1404, memory 1406, a removable storage 1418, and a non-removable storage 1420. The flight management system 1402 additionally includes a bus 1414 and a network interface 1416. The flight management system 1402 may include or have access to the computing system environment 1400 that includes one or more user input devices 1422, one or more output devices 1424, and one or more communication connections 1426 such as a network interface card or a universal serial bus connection.

The one or more user input devices 1422 may be a digitizer screen and a stylus, trackball, keyboard, keypad, mouse, and the like. The one or more output devices 1424 may be a display unit of the personal computer, the mobile device, a flight management system, and the like. The communication connections 1426 may include a local area network, a wide area network, and/or other networks.

The memory 1406 may include volatile memory 1408 and non-volatile memory 1410. A variety of computer-readable storage media may be stored in and accessed from the memory elements of the flight management system 1402, such as the volatile memory 1408 and the non-volatile memory 1410, the removable storage 1418 and the non-removable storage 1420. The memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 1404, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1404 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 1404 of the flight management system 1402. For example, a computer program 1412 may include machine-readable instructions capable of providing multiple undo and redo operations for the flight plan in the flight management system, according to the teachings and herein described embodiments of the present subject matter. In one embodiment, the computer program 1412 may be included on a compact disk-read only memory (CD-ROM) and loaded from the CD-ROM to a hard drive in the non-volatile memory 1410. The machine-readable instructions may cause the flight management system 1402 to encode according to the various embodiments of the present subject matter.

As shown, the computer program 1412 includes a flight plan module 1428 which includes a multiple undo and redo module 1430. For example, the multiple undo and redo module 1430 may be in the form of instructions stored on a non-transitory computer-readable storage medium. The non-transitory computer-readable storage medium having the instructions that, when executed by the flight management system 1402, may cause the flight management system 1402 to perform the one or more methods described in FIGS. 1 through 14.

In various embodiments, the methods and systems described in FIGS. 1 through 14 enables the pilot to perform any number of undo and redo operations on the flight plan.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of providing multiple undo and redo operations for a flight plan in a flight management system (FMS), comprising:

creating a temporary flight plan and a reference flight plan upon initiating a first revision on a created or default active flight plan by the FMS, wherein the temporary flight plan includes a copy of the active flight plan and the initiated first revision, and wherein the reference flight plan is a copy of the active flight plan; and enabling multiple undo and redo functions upon initiating multiple revisions on the temporary flight plan for performing multiple undo and redo operations on the temporary flight plan by the FMS, comprising:

- enabling a first undo function upon initiating a second revision on the temporary flight plan;
- performing a first undo operation to update the temporary flight plan and to enable a first redo function;
- performing a first redo operation to enable the first undo function;
- enabling a second undo function upon initiating a third revision on the updated temporary flight plan; and
- performing the second undo operation to further update the updated temporary flight plan and to enable a second redo function.

2. The method of claim 1, further comprising:

disabling the second redo function upon performing a second redo operation.

3. The method of claim 1, further comprising:

performing an insert operation to overwrite the active flight plan with the updated temporary flight plan; and performing an erase operation to delete the updated temporary flight plan and the reference flight plan and to disable the insert, erase, undo and redo functions.

4. The method of claim 1, further comprising:

storing the first revision, the second revision and the third revision in a list of pilot actions.

5. The method of claim 1, further comprising:

creating the active flight plan by a pilot.

6. A flight management system, comprising:

a processor; and memory coupled to the processor, wherein the memory includes a flight plan module, and wherein the flight plan module includes a multiple undo and redo module having instructions to:

create a temporary flight plan and a reference flight plan upon initiating a first revision on a created or default active flight plan, wherein the temporary flight plan includes a copy of the active flight plan and the initiated first revision, and wherein the reference flight plan is a copy of the active flight plan; and enable multiple undo and redo functions upon initiating multiple revisions on the temporary flight plan for performing multiple undo and redo operations on the temporary flight plan, wherein the multiple undo and redo module further having instructions to:

enable a first undo function upon initiating a second revision on the temporary flight plan;

perform a first undo operation to update the temporary flight plan and to enable a first redo function;

perform a first redo operation to enable the first undo function;

enable a second undo function upon initiating a third revision on the updated temporary flight plan; and perform the second undo operation to further update the updated temporary flight plan and to enable a second redo function.

7. The flight management system of claim 6, wherein the multiple undo and redo module further having instructions to:

disable the second redo function upon performing a second redo operation.

8. The flight management system of claim 6, further comprising:

a display unit, wherein the display unit includes one or more action buttons for performing the multiple undo and redo operations.

9. The flight management system of claim 8, wherein the temporary flight plan comprises the copy of the active flight plan created by a pilot and multiple revisions initiated by the pilot.

10. The flight management system of claim 9, wherein the multiple revisions are stored in a list of pilot actions.

11. A non-transitory computer-readable storage medium for providing multiple undo and redo operations for a flight plan in a flight management system having instructions that, when executed by a computing device, cause the computing device to perform a method comprising:

creating a temporary flight plan and a reference flight plan upon initiating a first revision on a created or default active flight plan, wherein the temporary flight plan includes a copy of the active flight plan and the initiated first revision, and wherein the reference flight plan is a copy of the active flight plan; and enabling multiple undo and redo functions upon initiating multiple revisions on the temporary flight plan for performing multiple undo and redo operations on the temporary flight plan, comprising:

enabling a first undo function upon initiating a second revision on the temporary flight plan;

performing a first undo operation to update the temporary flight plan and to enable a first redo function;

performing a first redo operation to enable the first undo function;

enabling a second undo function upon initiating a third revision on the updated temporary flight plan; and performing the second undo operation to further update the updated temporary flight plan and to enable a second redo function.

12. The non-transitory computer-readable storage medium of claim 11, further comprising:

disabling the second redo function upon performing a second redo operation.

13. The non-transitory computer-readable storage medium of claim 11, further comprising:

performing an insert operation to overwrite the active flight plan with the updated temporary flight plan; and performing an erase operation to delete the updated temporary flight plan and the reference flight plan and to disable the insert, erase, undo and redo functions.

14. The non-transitory computer-readable storage medium of claim 11, further comprising:

storing the first revision, the second revision and the third revision in a list of pilot actions.

15. The non-transitory computer-readable storage medium of claim 11, further comprising:

creating the active flight plan by a pilot.

* * * * *